S. J. FINCH.
STEAM COOKER.
APPLICATION FILED SEPT. 6, 1907.
908,850.
Patented Jan. 5, 1909.
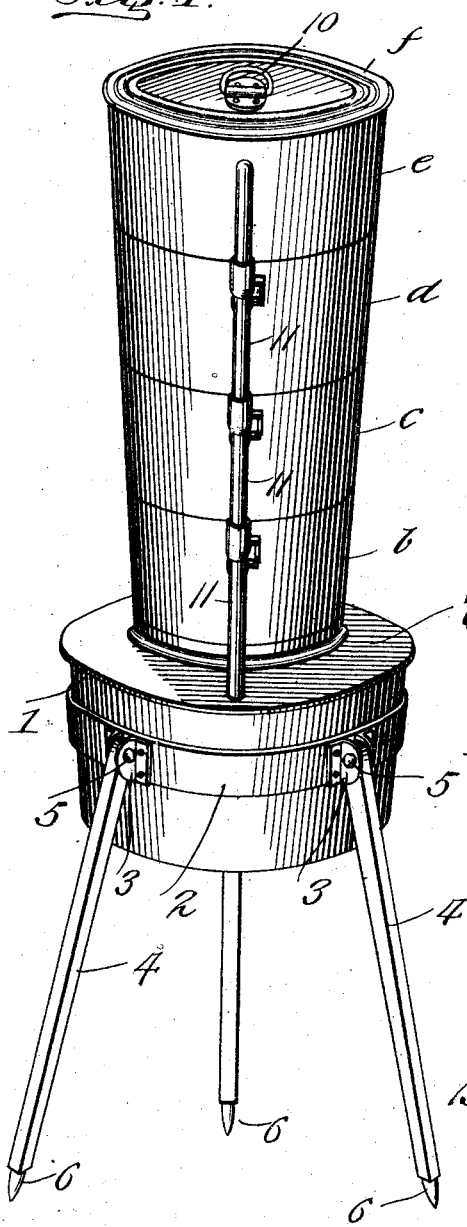
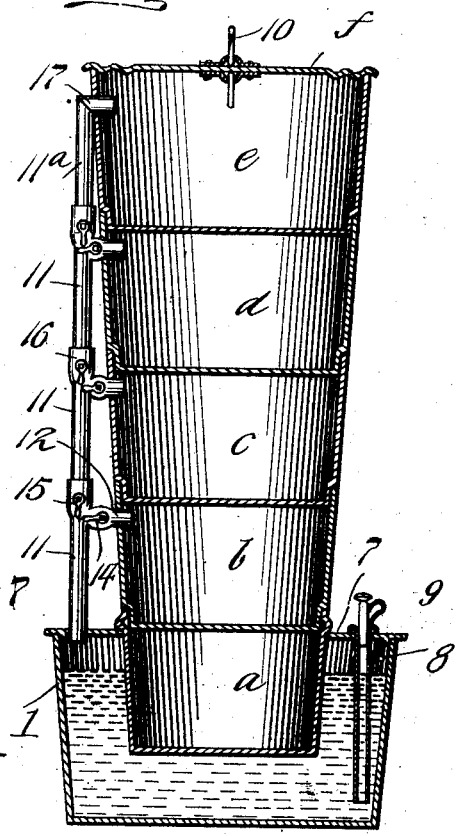
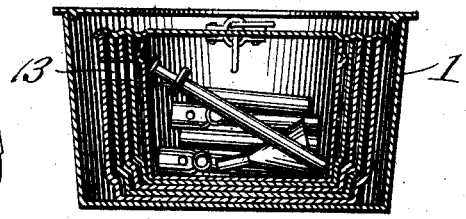
Witnesses
J. T. L. Wright,
Inventor
Serrin J. Finch,
By Victor J. Evans
Attorney

UNITED STATES PATENT OFFICE.

SERRIN JEROME FINCH, OF LOS ANGELES, CALIFORNIA.

STEAM-COOKER.

No. 908,850.     Specification of Letters Patent.     Patented Jan. 5, 1909.

Application filed September 6, 1907. Serial No. 391,655.

*To all whom it may concern:*

Be it known that I, SERRIN J. FINCH, a citizen of the United States, residing at Los Angeles, in the county of Los Angeles and State of California, have invented new and useful Improvements in Steam-Cookers, of which the following is a specification.

This invention relates to steam cookers and one of the principal objects of the invention is to provide a series of separate vessels all connected by a single pipe so that any one of the vessels may be removed without interfering with the efficiency of the others.

Another object of the invention is to provide a series of vessels of gradually increasing size so that all of the vessels may be nested within the water or steam vessel.

Still another object is to provide a simple alarm whistle which will indicate when the water in the steamer is below a given point.

These and other objects may be attained by means of the construction illustrated in the accompanying drawing, in which:—

Figure 1 is a perspective view of a steam cooker made in accordance with my invention and mounted upon a tripod stand. Fig. 2 is a central vertical section through the cooker removed from the stand and set up in condition for use. Fig. 3 is a sectional view taken through the vessels nested within the steamer and the sections of the pipe being shown disposed in the smaller inner vessel.

Referring to the drawing for a more particular description of my invention, the numeral 1 designates the steamer or water vessel which, as shown in Fig. 1, is mounted upon a tripod stand consisting of a hoop 2 provided with spaced lugs 3 and legs 4 pivoted between the lugs 3 on pintles 5, said legs having pointed lower ends 6. The hoop 2 is readily removable from the vessel 1. The vessel 1 is provided with a suitable cover 7 which is formed adjacent one of its edges with a suitable opening for a filling tube 8 in which an ordinary funnel may be placed for supplying water to the steamer and a detachable whistle 9 may be inserted within the upper end of the tube 8 to give an alarm when the water is low in the steamer. At a point opposite the filling tube 8 a hole is made in the cover 7 and the sectional pipe is inserted through this hole as will be hereinafter described. The cooking vessels are of gradually increasing size and are indicated by the letters $a$, $b$, $c$, $d$ and $e$, said vessels resting one within the other and forming a practical steam tight joint by means of the reduced lower end of each vessel fitting within the top of the next adjacent vessel. A suitable cover $f$ is provided for the upper vessel $e$ and said cover being provided with a suitable handle 10.

The pipe sections 11 one of which is inserted in an aperture adjacent the edge of the cover 7 each consists of a short pipe section having a right angularly extending nozzle 12 adapted to fit into an opening 13 in the side of one of the vessels. A cock 14 is provided in the branch 12 and a similar cock 15 is provided near the enlarged upper end of the pipe section 11 so that communication may be cut off between the pipe and the vessel and one section of the pipe from the next adjacent one. The lower end of each pipe section 11 is fitted into the enlarged portion 16 of the next adjacent pipe and, hence, any of the vessels may be detached and readily connected up to another vessel whenever required. The upper section $11^a$ of the pipe is plain and is provided with an elbow 17 extending into the upper vessel $e$. All the pipe sections are detachable and can be readily packed within the small vessel $a$ and all the vessels may be packed within the steamer 1, as shown in Fig. 3.

From the foregoing it will be obvious that the sectional pipe provides means whereby the vessels may be readily lifted one from the other and the steam cut off below so that any one or more of the vessels may be used without requiring the connection of the remainder.

Having thus described the invention, what is claimed as new, is:—

1. The herein described steam cooker comprising a steamer vessel, a series of vessels mounted upon the steamer, one above the other, and the bottom of each vessel resting within the top of the next adjacent vessel, a pipe communicating with the steamer and extending outside the vessel, said pipe comprising a series of sections, each section having an enlargement at its upper end to receive the next adjacent pipe section, a branch in each section extending inward and communicating with the interior of one of the vessels, a cock in each of the enlargements to cut off the steam from any one or more of the upper vessels, and a cock in each branch to cut off steam in any one of the individual vessels, substantially as described.

2. A steam cooker comprising a steamer, a cover therefor provided with apertures adjacent the edges thereof, a filling tube inserted in one of said apertures, a removable whistle in said tube, a series of vessels mounted upon the steamer, one above the other and the bottom of each vessel resting within the top of the next adjacent vessel, a pipe inserted in the other of said apertures and communicating with the steamer, each section having an enlargement to receive the next adjacent section, a branch in said section designed to communicate with one of the vessels, a cock in each of the enlargements, and a cock in each branch, said steamer adapted to hold said vessels and pipe sections when not in use, substantially as described.

In testimony whereof I affix my signature in presence of two witnesses.

SERRIN JEROME FINCH.

Witnesses:
CONRAD SMITH,
W. G. WHEELER.